United States Patent
Kojima et al.

(10) Patent No.: US 10,535,863 B2
(45) Date of Patent: Jan. 14, 2020

(54) GRAPHITE FILM, LAMINATE FILM, METHOD FOR PRODUCING SAME, AND ELECTRODE MATERIAL

(71) Applicant: KANEKA CORPORATION, Osaka-shi (JP)

(72) Inventors: Masahiro Kojima, Settsu (JP); Satoshi Oku, Settsu (JP); Makoto Kutsumizu, Settsu (JP); Yasushi Nishikawa, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 188 days.

(21) Appl. No.: 15/680,360

(22) Filed: Aug. 18, 2017

(65) Prior Publication Data
US 2017/0346069 A1 Nov. 30, 2017

Related U.S. Application Data

(63) Continuation of application No. PCT/JP2016/054950, filed on Feb. 19, 2016.

(30) Foreign Application Priority Data

Feb. 20, 2015 (JP) .................. 2015-032307

(51) Int. Cl.
  *H01M 4/04* (2006.01)
  *C01B 32/20* (2017.01)
  *H01M 4/583* (2010.01)
  *H01M 4/66* (2006.01)

(52) U.S. Cl.
  CPC .......... *H01M 4/0452* (2013.01); *C01B 32/20* (2017.08); *H01M 4/583* (2013.01); *H01M 4/661* (2013.01); *C01P 2006/40* (2013.01)

(58) Field of Classification Search
  CPC ....... C01B 32/205; C01B 32/21; C01B 32/20; H01M 4/0452; H01M 4/583; H01M 4/587; H01M 4/625; H01M 4/661; H01M 4/663; B32B 9/00; C01P 2006/40
  See application file for complete search history.

(56) References Cited

U.S. PATENT DOCUMENTS

2011/0045300 A1* 2/2011 Tamaoki ............... H01L 23/373
                                                          428/408

FOREIGN PATENT DOCUMENTS

| CN | 2368243 Y | * | 3/2000 |
| CN | 101697323 A | * | 4/2010 |
| JP | 2002012485 A | * | 1/2002 |
| JP | 2007-204299 | | 8/2007 |
| JP | 2008-80672 | | 4/2008 |
| JP | 2008-214171 | | 9/2008 |

(Continued)

OTHER PUBLICATIONS

EPO website machine translation of the description of JP 2014183261A (Year: 2014).*

(Continued)

*Primary Examiner* — Gregg Cantelmo
(74) *Attorney, Agent, or Firm* — Oblon, McClelland, Maier & Neustadt, L.L.P.

(57) ABSTRACT

A film includes a film body including graphite, and at least one fragment including graphite and formed on one or more surfaces of the film body. The film has a water contact angle of 50 degrees or greater and a glossiness of 20 or lower.

10 Claims, 6 Drawing Sheets

(56) References Cited

FOREIGN PATENT DOCUMENTS

| JP | 2010-1191 |   | 1/2010 |
|----|-----------|---|--------|
| JP | 2010-64949 |   | 3/2010 |
| JP | 2010-89344 |   | 4/2010 |
| JP | 2010-120819 A |   | 6/2010 |
| JP | 2011-105531 |   | 6/2011 |
| JP | 2012-101964 |   | 5/2012 |
| JP | 2013-59936 |   | 4/2013 |
| JP | 2013224258 A | * | 10/2013 |
| JP | 2014-156387 |   | 8/2014 |
| JP | 2014-183261 |   | 9/2014 |

OTHER PUBLICATIONS

EPO website machine translation of the description of CN 101697323A (Year: 2010).*
EPO website machine translation of the description of CN2368243Y (Year: 2000).*
EPO website machine translation of the description of JP 2010089344A (Year: 2010).*
International Search Report dated Apr. 12, 2016 in PCT/JP2016/054950.
International Preliminary Report on Patentability and Written Opinion dated Aug. 31, 2017 in PCT/JP2016/054950.
Japanese Office Action dated Jun. 26, 2018 in Japanese Patent Application No. 2017-500767 (with unedited computer generated English translation), 7 pages.

* cited by examiner

10 μm

10 μm

GRAPHITE FILM, LAMINATE FILM, METHOD FOR PRODUCING SAME, AND ELECTRODE MATERIAL

CROSS-REFERENCE TO RELATED APPLICATIONS

The present application is a continuation of International Application No. PCT/JP2016/054950, filed Feb. 19, 2016, which is based upon and claims the benefits of priority to Japanese Application No. 2015-032307, filed Feb. 20, 2015. The entire contents of these applications are incorporated herein by reference.

BACKGROUND OF THE INVENTION

Field of the Invention

The present invention relates to a graphite film, a laminate film, methods for producing such films, and to electrode material.

Discussion of the Background

Graphite films are known to have properties such as excellent thermal conductivity. When a radiation member is formed with a graphite film to utilize such properties, the graphite film is brought into contact with a heat-generating component, for example. However, since a graphite film is soft and prone to damage, its surface needs to be protected. Accordingly, a protection layer is formed on its surface by using, for example, PET resin, polyimide resin, aluminum foil, copper foil or the like. In addition, to efficiently express excellent thermal conductivity of a graphite film, it is necessary to fully adhere the graphite film to the heat source. For that matter, an adhesive layer may be formed on a surface of the graphite film by using epoxy resin or acrylic resin so as to bond it to the heat source.

Patent Publications 1~5, for example, are known, which relate to graphite composite films formed by laminating a protective layer and/or an adhesive layer or the like on at least one surface of a graphite film.

Patent Publication 1 describes a graphite composite film formed by laminating a removable film on at least part of a surface of a graphite film, using a removable film whose adhesiveness with the graphite film is 0.001 to 1 (N/25 mm). Moreover, the graphite film in Patent Publication 1 is described as having a water contact angle of 60 to 90 degrees.

In Patent Publication 2, a graphite film or the like is described as having a glossiness (Gs60°) of 32% or higher when determined by a glossiness measuring method as specified in JIS Z 8741, and a surface roughness (Ra) of 0.8 μm or less when determined by a surface roughness measuring method using an optical profilometer through light interference signals as specified in JIS B 0652.

Patent Publication 3 describes a method for producing a graphite film characterized by forming voids in a graphite film by exerting force to peel the graphite film in its thickness direction. Also, the graphite film in Patent Publication 3 is described as having a surface roughness (Ra) of 3.0 or less.

A graphite film in Patent Publication 4 is described as having an O/C atomic ratio of 0.01 to 0.30 when the surface elements are analyzed by X-ray photoelectron spectroscopy (XPS), and as having a water contact angle of 50 degrees or smaller. Also, Patent Publication 4 states that the number of irregularities with a minimum breadth of 0.1 to 5 μm may be present on the graphite-film surface at 5/25 $\mu m^2$ or more.

Patent Publication 5 describes a graphite composite film formed by covering at least part of the edge of a graphite film with a protective layer and an adhesive layer. Moreover, Patent Publication 5 describes optional surface treatments such as corona treatment, plasma treatment, frame processing, sandblasting, treatment using a coupling agent and the like.

PRIOR ART PUBLICATION

Patent Publication

Patent Document 1: JP2010-089344A (published Apr. 22, 2010)
Patent Document 2: JP2007-204299A (published Aug. 16, 2007)
Patent Document 3: JP2014-156387A (published Aug. 28, 2014)
Patent Document 4: JP2008-214171A (published Sep. 18, 2008)
Patent Document 5: JP2008-80672A (published Apr. 10, 2008)

SUMMARY OF THE INVENTION

Problems to be Solved by the Invention

The inventors of the present invention have conducted research and development on the aforementioned graphite composite films, and found that to improve characteristics of a graphite composite film and ease of its handling, adhesiveness is an important factor between the graphite film and a lamination material such as a protective layer and/or an adhesive layer.

However, the aforementioned conventional technologies have yet to improve graphite composite films when considering the adhesiveness of graphite films with lamination materials. Thus, there has been demand for development of graphite films having better adhesiveness with lamination materials.

The present invention was carried out in consideration of the aforementioned problems. Its objective is to provide a graphite film having excellent adhesiveness with lamination material such as a protective layer and/or an adhesive layer and to provide technology for employing such a graphite film.

Solutions to the Problems

The inventors of the present invention have conducted intensive studies to solve the aforementioned problems and found that adhesiveness is enhanced between a graphite film and lamination material such as a protective layer and/or an adhesive layer (i) by controlling the contact angle and glossiness of a graphite-film surface to have their respective specified values or (ii) by forming graphite fragments with a certain size on the graphite-film surface, and completed the present invention accordingly. Namely, the present invention includes the following aspects.

[1] A graphite film, characterized by having a water contact angle of 50 degrees or greater and a glossiness of 20 or lower.
[2] A graphite film, characterized in that a graphite fragment density on its surface is 5/100 μm or higher and the graphite fragments have a maximum length of 0.3 μm or greater.

[3] A laminate film, characterized in that the graphite film according to [1] or [2] is laminated with at least one lamination material selected from among metals, resins, metal oxides, metal carbides, metal nitrides, metal borides and metal silicides.

[4] The laminate film according to [3], characterized in that a sheet resistance in a planar direction is 25 mΩ/□ or lower.

[5] The laminate film according to [3] or [4], characterized in that the resin is a conductive resin.

[6] The laminate film according to any of [3] to [5], characterized in that the lamination material is laminated only on one surface of the graphite film.

[7] The laminate film according to any of [3] to [6], characterized in that the lamination material has an arithmetic mean roughness of 0.5 µm to 10 µm when measured as specified in JIS B 0601:2001.

[8] An electrode material, characterized by containing the laminate film according to any of [3] to [7].

[9] A method for producing a graphite film, characterized in that the method includes a step for conducting a surface roughening treatment on a graphite film having a porosity of 5% or higher, in which the graphite film has a planar orientation, and the surface roughening treatment is conducted by at least one method selected from among sandblasting, wet blasting, jet scrubbing, and buff polishing.

[10] The method for producing a graphite film according to [9], characterized in that the graphite film is obtained by heat treating a material made of a polymer film and/or a carbonized polymer film at a temperature of 2000° C. or higher.

[11] The method for producing a graphite film according to [10], characterized in that the polymer of the polymer film is at least one polymer selected from among polyimide, polyamide, polyoxadiazole, polybenzothiazole, polybenzobisthiazole, polybenzoxazole, polybenzobisoxazole, poly(p-phenylene vinylene), polybenzimidazole, polybenzobisimidazole and polythiazole.

[12] The method for producing a graphite film according to any of [9] to [11], characterized by including a step for liquid washing and/or gas washing the graphite film after the step for surface roughening treatment.

[13] A method for producing a laminate film, characterized in that the method includes a step for laminating at least one lamination material selected from among metals, resins, metal oxides, metal carbides, metal nitrides, metal borides and metal silicides through melt coating, solution coating, vapor deposition, sputtering, plating or chemical vapor deposition on a roughened surface of the graphite film produced by the method according to any of [9] to [12].

Effects of the Invention

A graphite film related to the present invention has excellent adhesiveness with lamination material such as a protective layer and/or an adhesive layer. Accordingly, the present invention provides a laminate film with enhanced adhesiveness between the graphite film and lamination material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
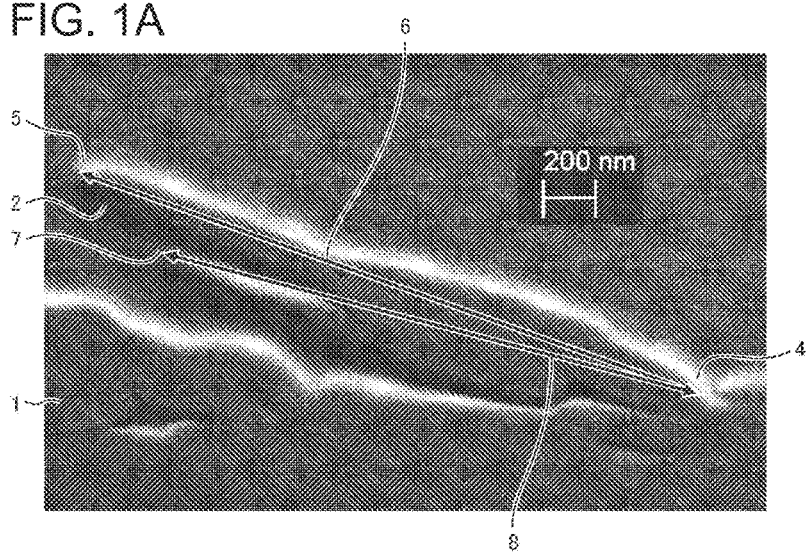
FIGS. 1A and 1B show SEM-observed images of a cross section of a graphite film according to Example 1.

The embodiments will now be described with reference to the accompanying drawings, wherein like reference numerals designate corresponding or identical elements throughout the various drawings.

The embodiments of the present invention are described in detail below. However, the present invention is not limited to those embodiments. In the present application, "A to B" indicating a range of numerical numbers means "at least A but no greater than B" unless otherwise specified.

[1. Graphite Film]

First Embodiment

A graphite film according to an embodiment of the present invention is not limited to any specific structure as long as either of its surfaces has a water contact angle of 50 degrees or greater and a glossiness of 20 or lower. A surface having a water contact angle of 50 degrees or greater and a glossiness of 20 or lower may be either surface of a graphite film, but may also be both of its surfaces. In other words, the graphite film may also be described as having a first surface at least on either or both of its surfaces, with the first surface having a water contact angle of 50 degrees or greater and a glossiness of 20 or lower. Descriptions of those characteristics are provided below.

<1-1. Contact Angle>

In the graphite film, a water contact angle on either or both of its surfaces is preferred to be greater than 50 degrees, more preferably 55 degrees or greater, even more preferably 60 degrees or greater, and especially preferably 70 degrees or greater. The upper limit is not specified, and preferably it is 110 degrees or smaller, more preferably 100 degrees or smaller.

In the technology described in Patent Publication 4, the water contact angle is 50 degrees or smaller, which is different from the angle set in the present invention. To reduce the water contact angle, a corona treatment, plasma treatment or the like is usually conducted, resulting in unstable functional groups generated therein. Such functional groups naturally break apart after the treatment. Thus, unless the graphite film is adhered to other material within a certain period of time after the treatment, adhesiveness is hard to achieve. By contrast, a surface roughening treatment is performed on a graphite film related to the present invention, eliminating such a treatment that generates unstable functional groups. Accordingly, the graphite film exhibits sufficient adhesiveness even when its water contact angle is greater than 50 degrees. Moreover, even after the graphite film is left standing for a while after treatment, its adhesiveness is not lowered.

The water contact angle on a graphite-film surface is determined by the following measuring method in the present application: set a graphite film on a contact angle meter S-250 (made by Kyowa Interface Science Co., Ltd.); fill a syringe (gauge 22, inner diameter of 0.41 mm, outer diameter of 0.72 mm, needle point cut at 90 degrees) with distilled water; drip water from a height of 5 mm onto the surface of a film; and measure the contact angle of the dripped water on the surface.

<1-2. Glossiness>

In the graphite film, the glossiness on either or both of its surfaces is preferred to be 20 or lower, more preferably 10 or lower, even more preferably 5 or lower.

A lower glossiness means a rougher surface. The graphite film related to the present invention has a glossiness of 20 or lower, indicating its surface is roughened. The anchoring effect derived from the roughened surface enhances adhesiveness at the time of lamination. The technology described in Patent Publication 2 focuses on producing a graphite film having excellent smoothness on its surface, and its technological concept is different from that of the present invention.

In the present application, the glossiness means surface glossiness (Gs60°) determined by the glossiness measuring method as specified in JIS Z 8741; more specifically, the glossiness of a graphite film is determined by setting (Gs60°) on a multi-angle gloss meter GS-4K (made by Suga Test Instruments Co., Ltd.).

Second Embodiment

In another embodiment of the present invention, a graphite film is not limited specifically as long as it has a surface where graphite fragments are present at a fragment density of 5/100 μm or higher, and graphite fragments have a maximum length of 0.3 μm or greater. Either or both surfaces of the graphite film may have a graphite fragment density of 5/100 μm or higher. In other words, the graphite film may also be described as having a second surface on either or both of its surfaces, and the second surface has a graphite fragment density of 5/100 μm or higher. The graphite film of the present embodiment is described in detail below.

<1-3. Graphite Fragment>

A graphite film related to the present invention contains a graphite fragment on either or both of its surfaces. In the present application, a graphite fragment means part of a graphite film which is peeled from its surface. In other words, part (or an end) of a graphite fragment is attached to a surface of a graphite film while another part (or another end) is detached from the graphite-film surface; that is, a graphite fragment is also referred to as such a portion part of which is peeled up from the graphite-film.

The presence of a graphite fragment is determined by observing a cross section of a graphite film by the following method, for example: first, impregnate a graphite film with a cold-setting potting resin and lightly vacuum draw it to remove air bubbles; cure the resin by leaving the film standing overnight; select at random a portion of the cured product containing the film; using a broad ion beam device "Ilion+" (made by Gatan, Inc.), cut the cured product vertically to have a breadth of 300 μm or wider relative to the film surface so as to obtain a cross section of the film; and observe the cross section by a scanning electron microscope "Ultra Plus" (made by Zeiss) with a mode for detecting secondary electrons. When an end of a graphite fragment is in contact with the graphite-film surface while another end is detached from the surface, it is determined that a graphite fragment is present. It is an option to observe a graphite film itself or a laminate film formed by laminating a graphite film with a lamination material such as a metal (for example, a laminate with a plated metal).

Figure 1B:
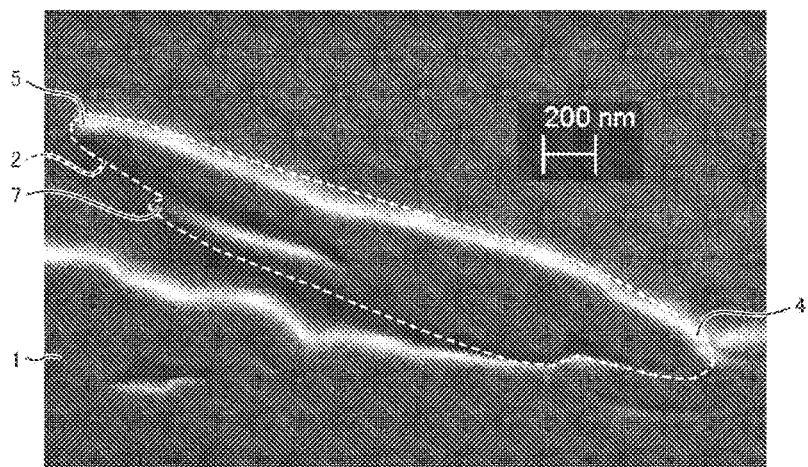

FIGS. 1A and 1B show views observed by a scanning electron microscope (SEM), which are images of a cross section of the graphite film later described in Example 1. It is an example of the cross section of a graphite film obtained by the above method. From FIG. 1A, it is found that graphite fragment 2 is present on a surface of graphite film 1, and an end 4 of graphite fragment 2 is attached to graphite film 1, while another end 5 is detached from graphite film 1. In FIG. 1B, dotted lines are added to FIG. 1A to surround graphite fragment 2, but arrows (6, 8) are omitted in FIG. 1B. Arrows (6, 8) are described later.

A graphite fragment is clearly different from a mere irregularity, even though they may end up with the same value when the surface roughness is measured. A mere irregularity is significantly different from a graphite fragment in that its surroundings are attached to the graphite film and no portion is detached from the graphite-film surface.

The graphite film has a graphite fragment, part of which is peeled up from the film surface. Thus, it is thought that the graphite fragment is hooked on a material laminated on the film surface, thereby enhancing its adhesiveness. In other words, a lamination material enters a space formed when a graphite fragment is peeled up so as to exhibit an anchoring effect. Therefore, the mechanism for increasing adhesiveness is different from that obtained by mere irregularities.

The maximum length of a graphite fragment is preferred to be 0.3 μm or greater, more preferably 2 μm or greater, and especially preferably 10 μm or greater. The maximum length of a graphite fragment is preferred to be 20 μm or less, more preferably 15 μm or less. If the maximum length of a graphite fragment is 0.3 μm or greater, the roughened surface expresses an anchoring effect, and adhesiveness at the time of lamination is thereby enhanced as described above. If the maximum length of a graphite fragment is 20 μm or less, it is preferable for forming a laminate film since such a length would not cause problems such as a graphite fragment being peeled off the graphite-film surface. In the present application, when a graphite fragment has multiple lengths, the maximum length means the maximum value among them.

Moreover, in the present application the maximum length of a graphite fragment means the length from an end of the fragment attached to the graphite-film surface to another end of the fragment detached from the graphite-film surface when observed in a cross-sectional view of the graphite film obtained as above. For example, in FIG. 1A, the maximum length of graphite fragment 2 is shown as the length from an end 4 attached to a surface of graphite-film 1 to another end 5 detached from the surface of graphite film 1 (the length indicated by arrow 6). In FIG. 1A, there are two lengths observed ((i) the length indicated by arrow 6 connecting an end 4 attached to a surface of graphite film 1 to another end 5 detached from the surface of graphite film 1; and (ii) the length indicated by arrow 8 connecting an end 4 attached to a surface of graphite-film 1 to yet another end 7 detached from the surface of graphite film 1). The maximum length of graphite fragment 2 is the longer one, which is indicated by arrow 6.

Moreover, in the present application, a graphite fragment having a maximum length of 0.3 μm or greater does not mean that all the graphite fragments present on a graphite-film surface have a maximum length of 0.3 μm or greater, but means that it is sufficient if at least one graphite fragment having a maximum length of 0.3 μm or greater is present on the graphite-film surface.

The maximum length of a graphite fragment is measured as follows, for example. The same as in the method for determining whether or not the aforementioned graphite fragment is present, a cross section of a graphite film is observed to measure the length from an end of a graphite fragment attached to a surface of the graphite film to another end detached from the surface. Such a procedure is repeated 10 times on a cross section of the graphite film, and if a maximum length satisfies the range defined in the present application at least once, the graphite film is determined to be within the scope of the present invention.

In addition, the thickness of a graphite film is not limited specifically, and may be set appropriately according to various usage purposes. It is preferred to be 10 μm to 10 mm, for example. The lower limit of the film thickness is preferred to be 15 μm or greater, more preferably 18 μm or greater. The upper limit of the film thickness is preferred to be 8 mm or less, more preferably 5 mm or less. If the thickness of a graphite film is 18 μm or greater, the graphite film is less likely to crack when a later-described surface roughening treatment is conducted thereon. Here, a graphite film of the present invention includes a thicker graphite product which is not usually referred to as a film (plate-shaped product); the scope of the present invention includes a graphite plate obtained by laminating multiple material films and by heat treating such a laminate, for example.

In the present application, the thickness of a graphite film means the average value of any 10 spots of a 50 mm×50 mm film measured in a room set under a constant temperature of 25° C. by using a thickness gauge (made by Heidenhain Corporation).

To achieve an even better anchoring effect, graphite fragments are preferred to be present on the graphite-film surface at a fragment density of 5/100 μm or greater. Graphite fragments are more preferred to be present at a fragment density of 7/100 μm to 600/100 μm, even more preferably 10/100 μm to 300/100 μm. A fragment density of 600/100 μm or lower is preferred since the sizes of graphite fragments are in a desired range. It is especially preferred to have a fragment density of 300/100 μm or lower, since the sizes of graphite fragments are expected to be 0.3 μm or greater. In the present application, a fragment density is obtained when the number of graphite fragments with a maximum length of 0.3 μm or greater is counted in a cross-sectional view of a graphite film observed as above, and when the number is converted to the value per cross-sectional width of 100 μm.

Moreover, to enhance the adhesiveness with lamination material, it is more preferred if the maximum length of a graphite fragment is 10 μm or greater and the fragment density is 10/100 μm or higher.

Graphite films according to the present invention include those having graphite fragments that contribute to exhibiting a water contact angle of 50 degrees or greater and glossiness of 20 or lower as shown in the first embodiment. Namely, the graphite film related to the present invention may be structured to have a water contact angle of 50 degrees or greater and glossiness of 20 or lower while also being structured to have a surface where graphite fragments are present at a fragment density of 5/100 μm or greater and the maximum length of the graphite fragments is 0.3 μm or greater.

[2. Method for Producing Graphite Film]

The method for producing a graphite film related to the present invention includes a step for performing surface roughening treatment on a graphite film having a porosity of 5% or higher. The graphite film has a planar orientation, and the surface roughening treatment is conducted by at least a method selected from among sandblasting, wet blasting, jet scrubbing, and buff polishing, and the rest of the procedures for the treatment are not limited to any specific steps, methods, materials and the like. In other words, the surface roughening treatment is performed on a surface parallel to the orientation direction of the graphite film.

The above production method is capable of producing a graphite film described above, that is, a graphite film with excellent adhesiveness.

<2-1. Orientation Direction>

The graphite film used in the production method related to the present invention has a planar orientation. Since the production method related to the present invention performs surface roughening treatment on a graphite film with the orientation direction set to be parallel to its surface, a graphite fragment is more likely to peel up, and the peeled-up graphite fragment is less likely to peel off the surface. Accordingly, an effect of enhanced adhesiveness with lamination material is expected. If a graphite film has random orientation directions, such an effect is hard to achieve.

To confirm the orientation direction, a graphite film is fractured by stretching it while maintaining its planar shape, and the fractured surface is observed by a scanning electron microscope "Ultra Plus" (made by Zeiss). In the present application, when the fractured surface is observed, if a layered structure parallel to the film surface is found near the surface, its orientation direction is determined to be parallel to the film surface (that is, the film is aligned in a planar direction), and if the surface structure is observed otherwise, its orientation direction is determined to be at random.

Regarding the above-mentioned graphite plate, its surface means the upper surface and/or lower surface (namely, not a side surface).

<2-2. Porosity>

A graphite film with a porosity of 5% or higher is used in the graphite film production method related to the present invention. In the present application, porosity means the space existing inside a graphite film (among graphene layers). The porosity indicates a ratio of voids to the volume of a graphite film, and is obtained by formula (1) below.

$$\text{porosity (\%)} = 100 \times (1 - \text{density}/\text{absolute specific gravity}) \quad (1)$$

In formula (1) above, "density" means the density of a graphite film (unit: $g/cm^3$). Also, "absolute specific gravity" in formula (1) above means the absolute specific gravity of the graphite film, and its value is 2.26 $g/cm^3$.

When a porosity is 5% or higher, impact during polishing of the graphite film is absorbed, thus preventing polishing that is unnecessarily deep. Moreover, if a void is present inside a graphite film, a graphite fragment is more likely to peel up, using the void as its point of origin. The porosity is more preferred to be 8% or higher, even more preferably 13% or higher, especially preferably 18% or higher. The upper limit of the porosity is not specified, but is preferably 90% or lower.

Moreover, the density of a graphite film in the present application means the value obtained when the weight (g) of a graphite film is divided by the volume ($cm^3$) calculated by multiplying the length, width and thickness of the graphite film. Here, the average value obtained by measuring 10 randomly picked points was used as the thickness of a graphite film.

<2-3. Surface Roughening Treatment>

Furthermore, in the method for producing a graphite film related to the present invention, a surface roughening treatment is preferred to be performed by at least a method selected from among sandblasting, wet blasting, jet scrubbing, and buff polishing. Such surface roughening treatment results in a graphite fragment on the graphite film. Moreover, unlike corona or plasma treatment, such surface roughening treatment does not produce unstable functional groups. Thus, the adhesiveness of the above-treated graphite film will not decrease even if the film is left standing for a long duration after the treatment. Note that Patent Publication 5 merely shows a method for conducting surface treatment.

The method for producing a graphite film related to the present invention may include a step for performing liquid wash and/or gas wash on the graphite film after the surface roughening treatment. In the present application, liquid wash means washing the graphite-film surface by using a liquid, for example, by flowing water little by little from a liquid-wash bottle. In addition, gas wash in the present application means washing the graphite-film surface by using a gas, for example, by blow-drying at a room-temperature or a high-temperature setting. Performing a wash eliminates a graphite fragment with weak adhesiveness (such as a fragment only slightly attached to the graphite-film surface) or a graphite fragment entirely detached from the graphite-film surface and simply sitting on the surface (such as a fragment not attached to the graphite film). However, an intense wash may entirely flush out graphite fragments including those attached to the graphite-film surface that would have expressed an anchoring effect. Thus, liquid wash and/or gas wash is preferred to be performed with appropriate force so as not to entirely flush out a graphite fragment that is expected to have an anchoring effect.

A graphite film that undergoes surface roughening treatment may be produced by any known method, for example, methods described in Patent Publications 1-5.

Moreover, the graphite film may be obtained by applying heat treatment at a temperature of 2000° C. on a raw-material film made of a polymer and/or carbonized polymer. In the present application, when a raw-material film made of a polymer and/or carbonized polymer is heat-treated at a temperature of 2000° C. or higher to obtain a graphite film, such a step is also referred to as a "graphitizing step."

As for a polymer of the polymer film, it may be at least one kind selected from among polyimide, polyamide, polyoxadiazole, polybenzothiazole, polybenzobisthiazole, polybenzoxazole, polybenzobisoxazole, poly(p-phenylene vinylene), polybenzimidazole, polybenzobisimidazole and polythiazole. It is preferred to use those polymers, since greater thermal conductivity is achieved in graphite films as final products. Furthermore, graphite films made of those polymers are preferable since the orientation direction is expected to be parallel to the graphite-film surface.

A polyimide film is especially preferable for the above polymer film, because graphite layer structures are easier to grow in a polyimide film than in polymer films made of other organic materials when the film is carbonized or graphitized.

Moreover, double refraction in a polyimide film is not particularly limited in the present invention, but a double refraction of 0.08 or higher makes it easier to carbonize or graphitize the film. Accordingly, it is easier to achieve a graphite film with developed graphite layers, and layers are likely to be parallel to each other. A higher index of refraction is preferable to achieve a higher thermal conductivity, electrical conductivity, heat diffusion coefficient or the like in the planar direction of the graphite film.

To form a graphite film from a polymer, the polymer as a starting material may be carbonized by being preliminarily heated in a vacuum or an inert gas atmosphere. Such a process is also referred to as a "carbonization step" in the present application. The carbonization step is usually performed at an approximate temperature of 1000° C.; for example, when the temperature rise is set at a rate of 10° C./min., it is preferred to maintain the polymer film in a temperature range of 1000° C. for about 30 minutes. In the present application, a polymer film as a starting material may also be referred to simply as a "polymer film," and the film obtained by carbonization may also be referred to as a "carbonized polymer film" or "carbonized film."

The temperature required for heat treatment in a graphitization step is at least 2000° C., preferably an ultimate temperature of 2400° C. or higher, more preferably 2600° C. or higher, even more preferably 2800° C. or higher. By heat treating at such temperatures, a graphite film is obtained to have an orientation direction set to be parallel to its surface. Heat treatment at temperatures lower than 2000° C. may cause random orientation. Heat treatment at higher temperatures results in a graphite film with excellent thermal conduction.

A graphitization step is performed in a vacuum or inert gas atmosphere. An inert gas is preferred to be argon or helium.

[3. Laminate Film]

Regarding the laminate film related to the present invention, as long as it is formed by laminating the graphite film with at least one lamination material selected from among metals, resins, metal oxides, metal carbides, metal nitrides, metal borides and metal silicides, the rest of its components are not limited particularly. The surface to be laminated with the lamination material is, as described earlier, (i) a surface with a water contact angle of 50 degrees or greater and a glossiness of 20 or lower, or (ii) a surface where graphite fragments are present at a fragment density of 5/100 μm or higher. Since the graphite fragment related to the present invention has excellent adhesiveness with lamination material as described above, the graphite film in the laminate film is firmly adhered to the lamination material. By contrast, the technology in Patent Publication 1, for example, is different from that of the present invention in that it relates to a graphite composite film obtained by laminating a detachable film.

In the above, "(i) a surface with a water contact angle of 50 degrees or greater and a glossiness of 20 or lower, or (ii) a surface where graphite fragments are present at a fragment density of 5/100 μm or higher" may also refer to the surface of a graphite film processed with the aforementioned surface roughening treatment. Furthermore, it also refers to a "first surface" or "second surface" as defined above.

<3-1. Lamination Material>

The lamination material is at least one kind selected from among metals, resins, metal oxides, metal carbides, metal nitrides, metal borides and metal silicides. Examples of a metal are pure metals such as copper, aluminum, magnesium, iron and SUS and their alloys. Examples of a resin are polyimide resins, epoxy resins, phenolic resins, acrylic resins, silicone resins, polyethylene resins, polypropylene resins, polyamide resins, polyester resins and the like. The metal oxides include silicon oxides, titanium oxides, alumina and the like; the metal carbides include titanium carbide, silicon carbide, zirconium carbide, tungsten carbide, molybdenum carbide and the like; the metal nitrides include titanium nitride, zirconium nitride, vanadium nitride and the like; the metal borides include titanium boride, zirconium boride, vanadium boride and the like; and the metal silicides include titanium silicide, zirconium silicide and the like.

When the lamination material is a resin, the resin may contain conductive fillers or it may be a conductive resin (for example, resins containing conductive polymers such as polyacetylene, polyaniline and polypyrrole). A laminate film using a conductive resin as its lamination material is preferred for use as electrode material.

The technology in Patent Publication 4, for example, selects adhesive resin material such as glues and adhesives and uses it as lamination material. By contrast, a graphite film related to the present invention has physical properties or graphite fragments on its surface as described above and exhibits excellent adhesiveness with lamination material, allowing lamination material to be used even if it is not a resin material containing specific functional groups. For example, according to the present invention, a graphite film and a plated film are laminated to have strong adhesiveness as shown in later-described examples.

In addition, since a laminate film related to the present invention does not use resin adhesives or the like for adhesion of a graphite film and lamination material, the laminate film has excellent heat resistance. Moreover, the laminate film related to the present invention is applicable for brazing (such as soldering) the lamination material on other material or members. For example, for a laminate film formed by laminating copper on the graphite film, soldering or the like can be performed on the copper-laminated surface.

If the lamination material is conductive, the laminate film is made conductive in its thickness direction.

The thickness of lamination material is not limited specifically; however, when copper is used as lamination material, it is preferred to have a thickness of 100 µm or less, more preferably 50 µm or less, even more preferably 25 µm or less, from the viewpoint of productivity.

To increase the thickness of lamination material, a graphite film is first laminated with a lamination material, on which a single-layer foil of the same lamination material is further brazed or welded.

When lamination material is laminated on both surfaces of a graphite film, the materials on each of both surfaces may be the same as or different from each other, and their thicknesses may be the same or different. When lamination material is laminated only on one surface of the graphite film, such a laminate is more preferable for use as electrode material.

When a laminate film is used as later-described electrode material, a leader electrode may be added to the surface of the lamination material. From a viewpoint of adhesiveness between the leader electrode and the lamination material, the lamination material in such a structure is preferred to have a mean arithmetic roughness (that of the surface in contact with the leader electrode) of 0.5 µm to 10 µm, more preferably 0.8 µm to 8 µm, even more preferably 1.0 µm to 5 µm, when measured as specified in JIS B 0601:2001.

<3-2. Adhesiveness>

In the laminate film related to the present invention, the adhesiveness between the graphite film and lamination material is preferred to be 0.10 N/cm or greater, more preferably 0.12 N/cm or greater, even more preferably 0.15 N/cm or greater. An adhesive force of 0.10 N/cm or greater is preferred, since the graphite film and lamination material are hard to peel away from each other.

The adhesiveness in the present application is determined by a generally used force gauge such as a tension tester made by Imada Co., Ltd. In the present application, adhesiveness means the value obtained as follows: attach aluminum tape to a laminate film and trim it to a 2 cm×4 cm piece to form a grip section; secure an end of the aluminum tape to the load cell fixed to the movable portion of the tension tester while securing an opposing end of the graphite film to the immovable portion of the tension tester; and by the load cell, measure the force generated when the aluminum tape is peeled from the graphite film at a rate of 1 mm/sec. while they maintain a T-shape. Note that the adhesiveness in the present application is measured by a method different from what is described in Patent Publication 1.

<3-3. Sheet Resistance in Planar Direction and Electric Resistance in Thickness Direction>

In a laminate film related to the present invention, the sheet resistance in a planar direction is preferred to be 100 mΩ/□ or lower, more preferably 50 mΩ/□ or lower, even more preferably 25 mΩ/□ or lower, especially preferably 5 mΩ/□ or lower, when the laminate film is used as electrode material. A sheet resistance set at 100 mΩ/□ or lower sufficiently reduces heat generated by electric current.

In a laminate film related to the present invention, the electric resistance in a thickness direction is preferred to be 500Ω or lower, more preferably 100Ω or lower, even more preferably 25Ω or lower, considering the heat generation by electric current.

An electric resistance of 500Ω or lower sufficiently reduces heat generated by electric current during actual use.

A sheet resistance in a planar direction and electric resistance in a thickness direction observed in a laminate film related to the present invention respectively mean the values measured by the methods specified in the later-described examples.

[4. Method for Forming Laminate Film]

Forming a laminate film related to the present invention is not limited to a specific method as long as it includes a step for laminating at least one lamination material selected from among metals, resins, metal oxides, metal carbides, metal nitrides, metal borides and metal silicides on the roughened surface of a graphite film produced by the aforementioned method by using a method such as melt coating, solution coating, vapor deposition, sputtering, plating or chemical vapor deposition. The rest of the procedures, materials, devices or the like are not limited specifically. As described earlier, the graphite film produced by a method related to the present invention has excellent adhesiveness. Thus, the method for forming a laminate film related to the present invention is capable of providing a laminate film where graphite film and lamination material are firmly adhered.

Any known method may be employed for conducting melt coating, solution coating, vapor deposition, sputtering, plating, or CVD.

As for a melt-coating method, the lamination material above is melted and coated on a graphite-film surface using a doctor blade or the like, for example.

A solution coating method is performed, for example, as follows: the above lamination material is dissolved in a solvent to prepare a solution, which is then coated on a graphite-film surface using a doctor blade or the like, and is dried to remove the solvent.

Examples of vapor deposition are vacuum deposition and ion plating.

As for sputtering, for example, DC sputtering, RF sputtering, magnetron sputtering or ion-beam sputtering may be used.

Electrolytic or electroless plating is available as a plating method.

As for CVD, for example, thermal CVD, optical CVD or plasma-enhanced CVD may be employed.

People skilled in the art are not limited to, but may appropriately select, specific procedures, materials, required devices or the like that are available for the above various methods.

According to the method for forming a laminate film related to the present invention, a laminate film may be single-sided with lamination material formed on one side of a graphite film, or it may be double-sided with lamination material formed on both surfaces. To laminate a metal as a lamination material only on one surface of a graphite film, CVD, sputtering, vapor deposition or plating listed as above is used.

When plating is used, it is easier to laminate a metal at a thickness of 1 μm or greater. However, if plating is conducted on a graphite film itself, the plated metal may end up on both of the film surfaces. To avoid such a situation, plating may be conducted by any of methods (1) to (3) below.

(1) Plating is conducted after only one surface of a graphite film is coated with a resin solution prepared by dissolving or melting a resin that does not dissolve in a plating solution. By so doing, a metal will be plated only on the surface where no resin is coated. After plating, the laminate film is immersed in a solvent to remove the coated resin, and is washed. In such a method, the coated resin works as a reinforcing material, thus making it less likely for the graphite film to break in roll-to-roll processing.

(2) A film or tape is prepared that can be removed after plating without damaging the graphite film. Prior to plating, the film or tape is attached only on one surface of a graphite film. Accordingly, a metal is laminated only on the surface opposite the one with film or tape attached thereon. The film or tape is removed after plating. In such a method, the film or tape works as a reinforcing material, thus making it less likely for the graphite film to break in a roll-to-roll process.

(3) A graphite film is prepared having graphite fragments only on one of its surfaces. The graphite film is plated, and the entire circumference of the laminate film is cut off after plating so as to peel the metal off the surface that does not have graphite fragments.

[5. Electrode Material]

The electrode material related to the present invention is not limited specifically as long as it contains the laminate film, and the rest of its components are not particularly specified. As described earlier, the surface for the lamination material to be laminated is (i) a surface with a water contact angle of 50 degrees or greater and a glossiness of 20 or lower, or (ii) a surface where graphite fragments are present at a fragment density of 5/100 μm or higher. Descriptions of topics already provided in [1. Graphite Film] through [4. Method for Forming Laminate Film] are omitted below, and the above descriptions will apply appropriately.

The lamination material is preferred to be among those in <3-1. Lamination Material>. When the lamination material is a resin, it is preferred to be conductive.

In addition, if the lamination material is laminated only on one surface of the graphite film, it is more preferable for use as electrode material.

Moreover, when the lamination film has physical properties described above in <3-3. Sheet Resistance in Planar Direction and Electric Resistance in Thickness Direction>, it is more preferable for use as electrode material.

When lamination material is laminated only on one surface of the graphite film, and when the sheet resistance in a planar direction of the graphite film is lower than that of the lamination material, such a laminate film is applicable for electrode material of various batteries. Especially, since the graphite film has excellent corrosion resistance, it is applicable for use as an electrode material that requires excellent anticorrosion properties. More specifically, when the graphite-film surface is brought into contact with an acidic or alkaline electrolyte having corrosiveness, the laminate material with a lower sheet resistance than the graphite film is made sure not to make contact with the electrolyte. Accordingly, a laminate film is formed as electrode material that exhibits a lower sheet resistance and excellent anticorrosion properties.

In the electrode material related to the present invention, a leader electrode may be arranged on the surface of the laminate film with lamination material formed thereon. A metal foil may be used as a leader electrode. Examples of a metal for metal foil are copper, aluminum, silver, gold, nickel, stainless steel and the like having a lower resistance. Among them, inexpensive copper foil and aluminum foil are preferred.

The thickness of metal foil is preferred to be 10 μm to 150 μm, more preferably 20 μm to 120 μm, even more preferably 30 μm to 100 μm.

It is preferable to combine a laminate film and metal foil listed above, since resistance is reduced.

The present invention is not limited to the embodiments described above, and any modification is possible within the scope of patent claims. Embodiments obtained by appropriately combining technical methods disclosed in different embodiments are also included in the technological scope of the present invention. Moreover, new technological characteristics may also be provided by combining technical methods respectively disclosed in the embodiments.

The present invention may also be structured as follows.

The graphite film related to the present invention is characterized by having a water contact angle of 50 degrees or greater and glossiness of 20 or lower on either or both of its surfaces.

The graphite film related to the present invention is characterized by having graphite fragments on either or both of its surfaces, and the maximum length of those fragments is 0.3 μm or greater.

In the graphite film related to the present invention, the graphite fragments may be present on a surface of the graphite film at a fragment density of 5/100 μm or higher.

The laminate film related to the present invention is characterized in that it is formed by laminating at least one lamination material, selected from among metals, resins, metal oxides, metal carbides, metal nitrides, metal borides and metal silicides, on a surface of the graphite film related to the present invention having a water contact angle of 50 degrees or greater and a glossiness of 20 or lower.

The laminate film related to the present invention is characterized in that it is formed by laminating at least one lamination material, selected from among metals, resins, metal oxides, metal carbides, metal nitrides, metal borides and metal silicides, on a surface of the graphite film related to the present invention having graphite fragments with a maximum length of 0.3 μm or greater.

The method for producing a graphite film according to the present invention is characterized in that the method includes a step for conducting surface roughening treatment on a graphite film with a porosity of 5% or higher, the surface roughening treatment is conducted on a surface that is parallel to the orientation direction of the graphite film, and the surface roughening treatment is conducted by employing at least one method selected from among sandblasting, wet blasting, jet scrubbing and buff polishing.

In the method for producing a graphite film according to the present invention, the graphite film may be obtained by heat treating material film made of a polymer and/or a carbonized polymer at a temperature of 2000° C. or higher.

In the method for producing a graphite film according to the present invention, the polymer of the polymer film may be at least one polymer selected from among polyimide, polyamide, polyoxadiazole, polybenzothiazole, polybenzobisthiazole, polybenzoxazole, polybenzobisoxazole, poly(p-phenylene vinylene), polybenzimidazole, polybenzobisimidazole and polythiazole.

The method for producing a graphite film according to the present invention may include a step for conducting liquid wash and/or gas wash on the graphite film after the step for surface roughening treatment.

The method for forming a laminate film according to the present invention is characterized in that the method includes a step for laminating at least one lamination material, selected from among metals, resins, metal oxides, metal carbides, metal nitrides, metal borides and metal silicides, on a roughened surface of the graphite film produced according to a graphite-film production method of the present invention by conducting melt coating, solution coating, vapor deposition, sputtering, plating or chemical vapor deposition.

EXAMPLES

The present invention is now described in further detail by referring to the following examples. However, the present invention is not limited to those examples.

[Graphite Films Used in Examples]

Polyimide films with different thicknesses were heat-processed at a temperature of 2000° C. or higher and then compressed to prepare graphite film (A) (density: 1.84 g/cm$^3$, thickness: 25 μm), graphite film (B) (low expansion, density: 2.12 g/cm$^3$, thickness: 22 μm), graphite film (C) (high expansion, density: 0.25 g/cm$^3$, thickness: 300 μm), and graphite film (D) (low expansion, density: 2.19 g/cm$^3$, thickness: 5 μm). Also, a polyimide film was heat-processed at 1400° C. to prepare carbonized film (E) (density: 1.80 g/cm$^3$, thickness: 5 μm).

[MIT Bending Strength Test]

On each of the graphite films and carbonized film, an MIT bending strength test was conducted to determine how many times each film was able to withstand bending. For MIT bending strength testing, each of the graphite films and carbonized film was cut into a 1.5 cm×10 cm piece, and placed in an MIT flex fatigue resistance tester (model D, made by Toyo Seiki Co., Ltd.) under conditions of a test load: 100 gf (0.98 N), rate of bending: 90 counts/min., radius of curvature (R) at bending clamp: 2 mm, and bending angle: 90 degrees to the left and right.

Other physical properties were determined by measuring them according to the methods described above.

[Forming Laminate Films]

(1) Lamination of Resin

A resin solution was prepared by dissolving "ZEONOR® 1020R" (made by Zeon Corporation) in ethylcyclohexane at a concentration of 10 wt. %. The resin solution was coated on the treated surface of a graphite film using a doctor blade (gap:150 μm), and dried at 80° C. for 4 minutes and 150° C. for 4 minutes to obtain a laminate film. Namely, a laminate film was formed by using a resin as the lamination material and by employing solution coating as the lamination method.

(2) Lamination of Sputter-Coated Film

Using a sputtering device NSP-6 (made by Showa Shinku Co., Ltd.) and copper (simple element) as the target and by setting a sputtering gas pressure of 13.5 Pa (argon gas) and an output power of 900 W, sputtering was conducted for 150 seconds to form a 200 μm-thick conductive layer on the treated surface of a graphite film so as to obtain a laminate film. Namely, a laminate film was formed by using a metal as the lamination material and by employing sputtering as the lamination method.

(3) Lamination of Plated Film

A plating bath was prepared by mixing 70 g/L of copper sulfate pentahydrate, 200 g/L of sulfuric acid, 50 mg/L of chlorine and an appropriate amount of Top Lucina SF-M. A graphite film was immersed in the plating bath using itself as a negative electrode and a phosphorous-containing copper plate as the positive electrode, and current was flowed at 3 A/dm$^2$ for 8 minutes so as to obtain a plated laminate film. Namely, a laminate film was formed by using a metal as the lamination material and by employing plating as the lamination method.

[Evaluation of Adhesiveness]

The adhesiveness was determined by the aforementioned method: a result of 0.10 N/cm or higher was evaluated as good (G), and a result of lower than 0.10 N/cm as poor (P).

Examples 1-10 and Comparative Examples 1-6

Example 1

Figure 2:
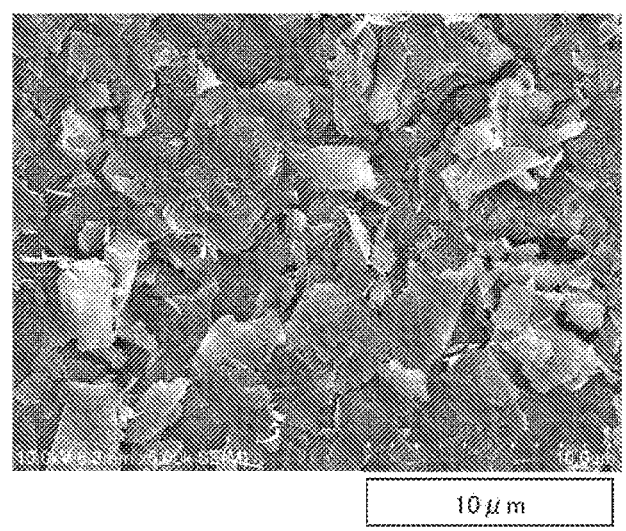
FIG. 2 shows an SEM-observed image of a surface of the graphite film according to Example 1.
Figure 3A:
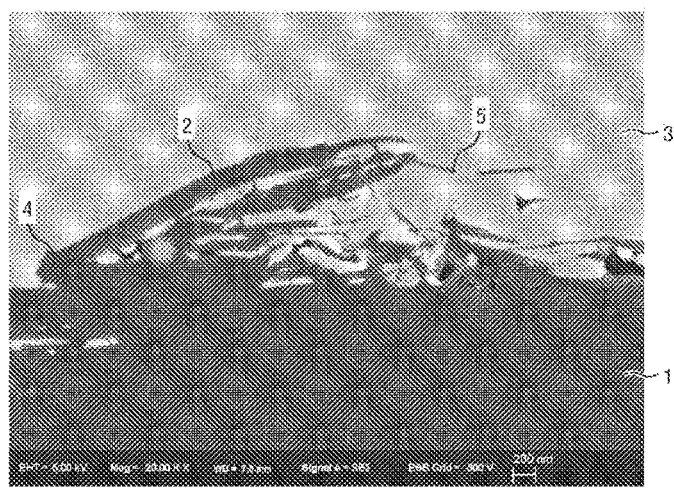
FIGS. 3A and 3B show SEM-observed images of a cross section of a laminate film according to Example 1.
Figure 3B:
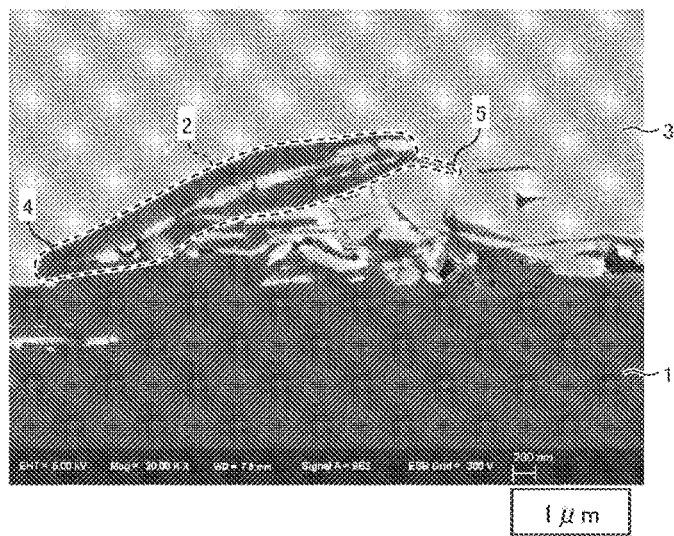

A graphite film (A) was processed by using a wet blasting device and polygonal polishing alumina (grain size #800) and by setting a processing pressure of 0.1 MPa and a film transfer rate of 20 mm/sec. Then, the graphite film was turned upside down and the same process was conducted thereon. After that, the processed surfaces were rinsed using a wash bottle. Accordingly, a surface-treated graphite film was obtained. Various physical properties of the surface-treated graphite film were measured, and the results are shown in Tables 1 and 2. FIGS. 1A and 1B show SEM-observed images of a cross-section of the graphite film prepared in Example 1. FIG. 2 shows an SEM-observed image of a surface of the graphite film prepared in Example 1. FIGS. 3A and 3B show SEM-observed images of a cross-section of the laminate film (with a plated film formed thereon) prepared in Example 1. FIG. 3B is a view where dotted lines are added to the image in FIG. 3A so as to surround a graphite fragment 2.

Example 2

Figure 4:
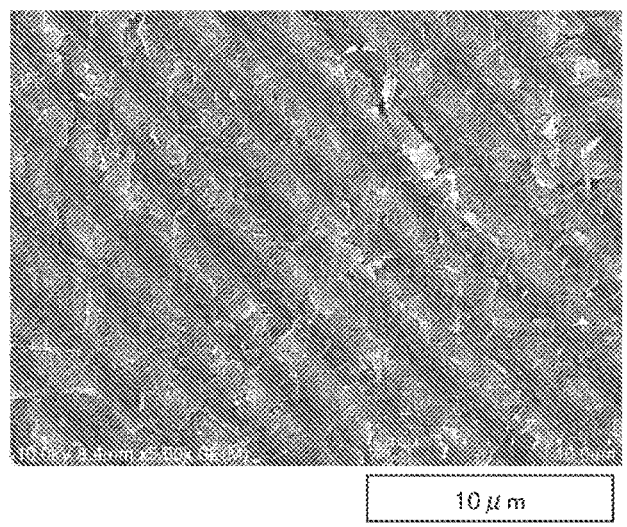
FIG. 4 shows an SEM-observed image of a surface of a graphite film according to Example 2.
Figure 5A:
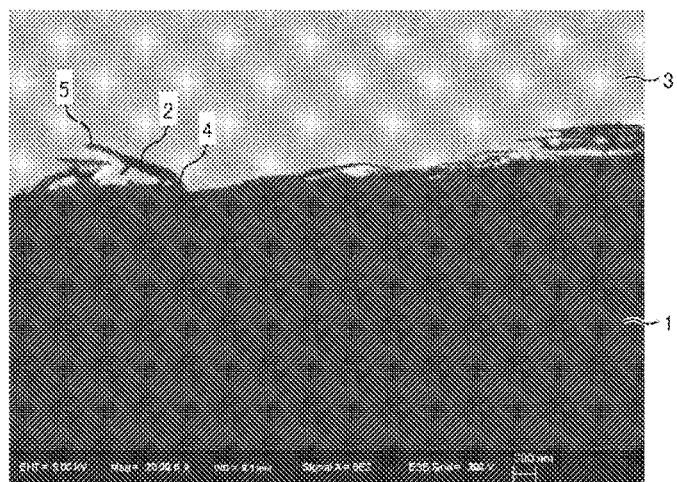
FIGS. 5A and 5B show SEM-observed images of a cross section of a laminate film according to Example 2.
Figure 5B:
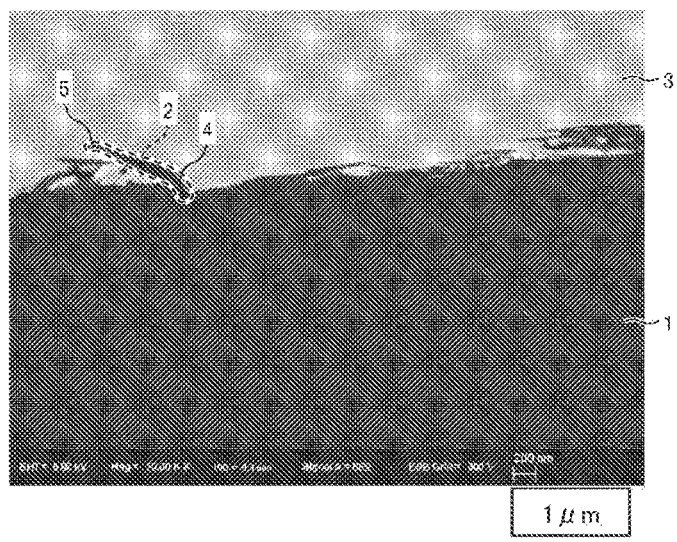

A surface-treated graphite film was prepared the same as in Example 1 except that the grain size of the polygonal polishing alumina was changed from #800 to #2000. Various physical properties of the film were measured, and the results are shown in Tables 1 and 2. In addition, FIG. 4 is an SEM-observed image of a surface of the graphite film prepared in Example 2. FIGS. 5A and 5B show SEM-observed images of a cross-section of the laminate film (with a plated film formed thereon) prepared in Example 2. FIG. 5B is a view where dotted lines are added to the image in FIG. 5A so as to surround a graphite fragment 2.

Example 3

Both surfaces of a graphite film (A) were sandblasted. Then, treated surfaces were rinsed using a wash bottle and dried with a blower. Accordingly, a surface-treated graphite film was obtained, and its various physical properties were measured. The results are shown in Tables 1 and 2.

Example 4

A surface-treated graphite film was prepared by employing the same method as in Example 3, except that neither a process for rinsing the graphite film with a wash bottle nor a process for blow-drying the film was conducted. Various physical properties of the graphite film were measured, and the results are shown in Tables 1 and 2.

Example 5

A surface-treated graphite film was prepared by performing corona treatment at a processing density of 150 W/min./m² on both surfaces of a graphite film prepared the same as in Example 4. Various physical properties of the film were measured, and the results are shown in Tables 1 and 2.

Example 6

A surface-treated graphite film was prepared by employing the same method as in Example 4, except that the sandblasting conditions were changed. Various physical properties of the film were measured, and the results are shown in Tables 1 and 2.

Example 7

A surface-treated graphite film was prepared by employing the same method as in Example 2, except that a graphite film (A) was replaced with a graphite film (B). Various physical properties of the film were measured, and the results are shown in Tables 1 and 2.

Example 8

A surface-treated graphite film was prepared by employing the same method as in Example 6, except that a graphite film (A) was replaced with a graphite film (B). Various physical properties of the film were measured, and the results are shown in Tables 1 and 2.

Example 9

A surface-treated graphite film was prepared by employing the same method as in Example 2, except that a graphite film (A) was replaced with a graphite film (C). Various physical properties were measured, and the results are shown in Tables 1 and 2.

Example 10

A surface-treated graphite film was prepared by employing the same method as in Example 6, except that a graphite film (A) was replaced with a graphite film (C). Then, various physical properties were measured, and the results are shown in Tables 1 and 2.

Comparative Example 1

Figure 6:
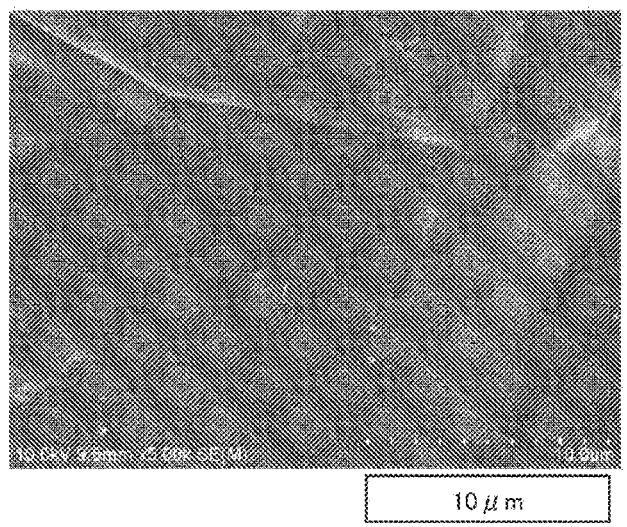
FIG. 6 shows an SEM-observed image of a surface of a graphite film according to Comparative Example 1.

A graphite film (A) was not surface-treated, and its various physical properties were measured. The results are shown in Tables 1 and 2. FIG. 6 shows an SEM-observed image of a surface of the graphite film prepared in Comparative Example 1.

Comparative Example 2

Figure 7:
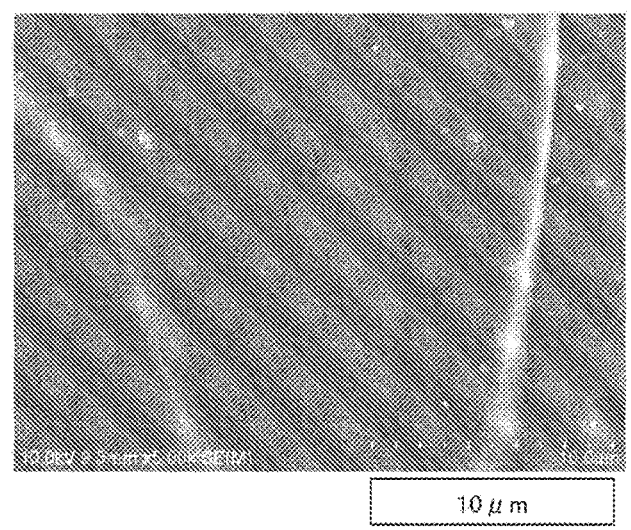
FIG. 7 shows an SEM-observed image of a surface of a graphite film according to Comparative Example 2.

A surface-treated graphite film was prepared by performing corona treatment (processing density of 3000 W/min./m²) on both surfaces of a graphite film (A). Then, various physical properties were measured, and the results are shown in Tables 1 and 2. FIG. 7 shows an SEM-observed image of a surface of the graphite film prepared in Comparative Example 2.

Comparative Example 3

Both surfaces of a graphite film (A) were polished with sandpaper and corona treatment was performed (processing density of 3000 W/min./m²). Various physical properties of the obtained graphite film were measured, and the results are shown in Tables 1 and 2.

Comparative Example 4

Surface treatment was conducted by the same method as in Example 6, except that a graphite film (A) was replaced with a graphite film (D). The results are shown in Tables 1 and 2.

Comparative Example 5

A graphite film was prepared by performing surface treatment using the same method as in Comparative Example 4, except that the sandblasting pressure was reduced from that in Example 6. Various physical properties of the obtained graphite film were measured, and the results are shown in Tables 1 and 2.

Comparative Example 6

Surface treatment was conducted by employing the same method as in Example 6 except that a graphite film (A) was replaced with a carbonized film (E). The results are shown in Tables 1 and 2.

TABLE 1

| | Film that was used | Orientation direction | MIT bending strength test | Density prior to treatment (g/cm³) | Porosity (%) |
|---|---|---|---|---|---|
| Example 1 | A | parallel | 100 times or more | 1.84 | 20 |
| Example 2 | | | | | |
| Example 3 | | | | | |
| Example 4 | | | | | |
| Example 5 | | | | | |
| Example 6 | | | | | |
| Example 7 | B | | less than 100 times | 2.12 | 6 |
| Example 8 | | | | | |
| Example 9 | C | | | 0.25 | 89 |
| Example 10 | | | | | |
| Comp. Example 1 | A | | 100 times or more | 1.84 | 20 |
| Comp. Example 2 | | | | | |
| Comp. Example 3 | | | | | |

TABLE 1-continued

| | Film that was used | Orientation direction | MIT bending strength test | Density prior to treatment (g/cm³) | Porosity (%) |
|---|---|---|---|---|---|
| Comp. Example 4 | D | | less than 100 times | 2.19 | 3 |
| Comp. Example 5 | | | | 2.19 | 3 |
| Comp. Example 6 | E | random | less than 10 times | 1.80 | 20 |

TABLE 2

| | Contact angle (°) | Glossiness | Maximum length of graphite fragment (μm) | Fragment density (#/100 μm) | Adhesiveness with resin (N/cm) | | Adhesiveness with sputtered film (N/cm) | | Adhesiveness with plated film (N/cm) | |
|---|---|---|---|---|---|---|---|---|---|---|
| Example 1 | 90 | 3.4 | 10 | 10~20 | G | 0.20 | G | 0.17 | G | 0.21 |
| Example 2 | 88 | 9.2 | 2 | 45~55 | G | 0.12 | G | 0.12 | G | 0.12 |
| Example 3 | 87 | 2.8 | 14 | 10~20 | G | 0.19 | G | 0.15 | G | 0.22 |
| Example 4 | 87 | 3.2 | 14 | 10~20 | G | 0.17 | G | 0.14 | G | 0.21 |
| Example 5 | 53 | 3.3 | 12 | 10~20 | G | 0.19 | G | 0.14 | G | 0.21 |
| Example 6 | 88 | 18 | 10 | 7~15 | G | 0.13 | G | 0.12 | G | 0.12 |
| Example 7 | 86 | 9.5 | 3 | 25~35 | G | 0.11 | G | 0.12 | G | 0.11 |
| Example 8 | 87 | 7.6 | 8 | 7~15 | G | 0.14 | G | 0.12 | G | 0.13 |
| Example 9 | 91 | 6.3 | 6 | 7~15 | G | 0.15 | G | 0.16 | G | 0.14 |
| Example 10 | 90 | 5.8 | 10 | 7~15 | G | 0.16 | G | 0.17 | G | 0.15 |
| Comp. Example 1 | 88 | 25.9 | no fragment confirmed | | P | <0.05 | P | <0.05 | P | <0.05 |
| Comp. Example 2 | 9 | 24.7 | | | P | <0.05 | P | <0.05 | P | <0.05 |
| Comp. Example 3 | 10 | 21.2 | 18 | 3 | P | 0.08 | P | <0.05 | G | 0.10 |
| Comp. Example 4 | | | film broke during treatment | | | | | | | |
| Comp. Example 5 | 90 | 23.9 | 10 | 2 | P | <0.05 | P | <0.05 | P | <0.05 |
| Comp. Example 6 | | | film broke during treatment | | | | | | | |

<Results>

Graphite films in Examples 1~10, having a water contact angle of 50 degrees or greater and a glossiness of 20 or lower, exhibited excellent adhesiveness regardless of their respective structures formed with a laminated resin, sputtered film or plated film. Moreover, graphite films in Examples 1~10 each had graphite fragments having a maximum length of 2 to 14 μm and a fragment density of 7 to 55/100 μm. Also, the presence of graphite fragments is confirmed in FIGS. 2 and 4, for example. In addition, the same as FIGS. 1A, 1B, 3A and 5A show that a graphite fragment 2 is present on a surface of graphite film 1 in such a condition that one end 4 of graphite fragment 2 is attached to graphite film 1 while another end 5 is detached from graphite film 1. Moreover, from FIGS. 3A, 3B, 5A and 5B, it is found that lamination material 3 enters the space formed when graphite fragment 2 is peeled up on a surface of graphite film 1. Accordingly, graphite films and laminate films related to the present invention express an anchoring effect and exhibit excellent adhesiveness.

By contrast, graphite films in Comparative Examples 1~3 and 5, having a water contact angle smaller than 50 degrees and/or a glossiness higher than 20, showed poor results (P) when laminated with a resin, sputtered film or plated film. Especially, Comparative Examples 1, 2 and 5 prepared by employing different lamination methods all showed poor results (P). For example, FIGS. 6 and 7 show that no graphite fragments such as shown in FIGS. 2 and 4 were found on surfaces of a graphite film that did not undergo surface treatment as in Comparative Example 1 and of a graphite film that underwent corona treatment as in Comparative Example 2. Moreover, in Comparative Example 4 prepared using a graphite film with a porosity of 3% and in Comparative Example 6 prepared using a carbonized film with a random orientation, films broke during treatment.

Examples 1 and 3~5, where the maximum length of a graphite fragment is 10 μm or greater and the fragment density is 10/100 μm or higher, exhibited especially excellent adhesiveness with a plated film.

[Mean Arithmetic Roughness]

Mean arithmetic roughness (Ra) was measured as specified in JIS B 0601:2001 by using a contact-type surface roughness tester (SJ-201, made by Mitutoyo Corporation). If a copper layer is laminated only on one surface, the surface roughness of the copper layer was measured. Samples were each cut into a 3 cm square for measurement and fixed with tape to the tester's measurement stand. The radius of curvature at the tip of a needle was 2 μm.

[Sheet Resistance in a Planar Direction]

To measure the sheet resistance in a planar direction, the surface resistivity was determined by using a low resistivity meter Loresta-GP (MCP-T610, made by Mitsubishi Chemical Analytech Co., Ltd.) and by pressing an LSP probe (MCP-TPLSP, made by Mitsubishi Chemical Analytech) against the surface of a graphite film.

[Electric Resistance in Thickness Direction]

A graphite film was cut into a 15 mm square while preventing burrs on the cut surface of the graphite film, and the electric resistance in a thickness direction was measured by pressing a probe of a digital multimeter against each plane of the square firmly but carefully so as not to break the film. In Table 3, when the electric resistance in a thickness direction was 500Ω or lower, it was determined that the electrical resistance is sufficiently low and denoted as "L," whereas if it is higher than 500Ω, it is determined that the electrical resistance is high and denoted as "H."

[Tolerance to Sulfuric Acid]

On one surface of a graphite film, a drop of 64% sulfuric acid was dripped and was kept there for an hour. If the graphite film was a single-side plated film, sulfuric acid was dripped onto the unplated surface. After testing, the sulfuric acid was rinsed off with water and dried. Then, by visually observing the change in shape of the surface where sulfuric acid was dripped, if there was no change, the result was evaluated as being tolerant, whereas if a change was observed, the result was evaluated as being intolerant.

[Bonding with Different Material]

A graphite film was cut into a 5 cm square and was held in air while keeping it with forceps. Next, a temperature-adjustable soldering iron heated at 350° C. was brought into contact with one surface, and a solder wire was pressed against the other surface and melted. The solder wire was released and the soldering iron was positioned away from the graphite film so as to cool the film. When the graphite film was laminated with a copper layer, the solder wire was pressed onto the copper layer. When solder was wet-spread on the graphite film and no spontaneous peeling was observed between the copper layer and the graphite film, the adhesiveness was evaluated as good (G); when solder was not wet-spread or the solder was peeled off when the film was bent, the adhesiveness was evaluated as poor (P).

Examples 11~14 and Comparative Examples 7-9

Example 11

On one surface of a graphite film (A), a plating resist was coated to form an unplated surface, and the opposite surface was surface-treated the same as in Example 1. Accordingly, a single-side surface-treated graphite film was obtained. The single-side surface-treated graphite film was plated by following the procedures in the above-described (3) Lamination of Plated Film in [Forming Laminate Film]. Next, the plated film was immersed in xylene to fully remove the resist, rinsed with isopropanol, and further washed with water. Accordingly, a single-side plated laminate film was obtained. When converted from weight change before and after plating, specific gravity of copper and the area of film, it was found that a copper layer with an average thickness of 5 μm was provided. Various physical properties of the laminate film were measured, and the results are shown in Table 3.

Example 12

A single-side surface-treated graphite film was prepared by laminating a low-adhesion film (CLEAR-PET50-06-50, made by LINTEC Corporation) on one surface of a graphite film (A), and by conducting surface treatment the same as in Example 1 on the opposite surface. The low-adhesion film is removable without causing damage to the graphite film after plating. The single-side surface-treated graphite film was plated by following the procedures in the above-described (3) Lamination of Plated Film in [Forming Laminate Film]. Next, the weak adhesion film was peeled off the graphite film to obtain a single-side plated laminate film. When observed by the same method as in Example 11, it was found that a copper layer with an average thickness of 5 μm was provided. Various physical properties of the laminate film were measured, and the results are shown in Table 3.

Example 13

Surface treatment the same as in Example 1 was conducted on one surface of a graphite film (A). A single-side surface-treated graphite film was prepared by conducting surface treatment on a graphite film (A) the same as in Example 1. Plating was performed on the single-side surface-treated graphite film by following the procedures in the above-described (3) Lamination of Plated Film in [Forming Laminate Film], except that the current flow time was 16 minutes. By cutting 3 mm off each of the four sides of the plated graphite film, the copper layer on the surface without surface treatment was removed. Accordingly, single-side plated laminate film was obtained. When observed by the same method as in Example 11, it was found that a copper layer with an average thickness of 5 μm was provided. Various physical properties of the laminate film were measured, and the results are shown in Table 3.

Example 14

Surface treatment the same as in Example 1 was conducted on one surface of a graphite film (A). Plating was performed on the single-side surface-treated graphite film by following the procedures in the above-described (3) Lamination of Plated Film in [Forming Laminate Film], except that the current flow time was 3 minutes. By cutting 3 mm off each of the four sides of the plated graphite film, the copper layer on the surface without surface treatment was peeled. Accordingly, single-side plated laminate film was obtained. When observed by the same method as in Example 11, it was found that a copper layer with an average thickness of 1 μm was provided. Various physical properties of the laminate film were measured, and the results are shown in Table 3.

Comparative Example 7

Various physical properties of a 5 μm-thick pure copper foil (made by The Nilaco Corporation) were measured. The results are shown in Table 3.

Comparative Example 8

A double-sided adhesive film (#8602 TNW-05, made by DIC Corporation) was laminated on one surface of a graphite film (A), and a 5 μm-thick pure copper foil (made by The Nilaco) was further laminated thereon. Various physical properties were measured, and the results are shown in Table 3.

Comparative Example 9

Various physical properties of a graphite film (A) itself were measured and the results are shown in Table 3.

TABLE 3

|  | Mean arithmetic roughness (Ra) (μm) | Sheet resistance in planar direction (mΩ/□) | Electric resistance in thickness direction | Tolerance to sulfuric acid | Bonding with different material |
|---|---|---|---|---|---|
| Example 11 | 1.5 | 3.9 | L | yes | G |
| Example 12 | 1.4 | 3.8 | L | yes | G |
| Example 13 | 1.4 | 4.5 | L | yes | G |
| Example 14 | 1.6 | 23 | L | yes | G |
| Comp. Example 7 | 0.1 | 3.5 | L | none (color change due to corrosion) | G |
| Comp. Example 8 | 0.1 | 3.6 | H | yes | P (peeled) |
| Comp. Example 9 | 1.0 | 34 | L | yes | P (peeled, did not wet-spread) |

<Results>

The mean arithmetic roughness was found to be greater in Examples 11~14 than in Comparative Examples 7~9. Regarding Examples 11~14 and Comparative Example 9, single-side copper-plated laminate films showed a smaller sheet resistance in a planar direction and exhibited excellent bonding results with different materials when compared with a graphite film itself. Also, regarding Examples 11~14 and Comparative Example 8, single-side copper-plated laminate films showed a lower electric resistance in a thickness direction and exhibited excellent bonding results with different materials when compared with a film prepared by laminating a copper layer and a graphite film by using an adhesive. Furthermore, regarding Examples 11~14 and Comparative Example 7, single-side copper-plated laminate films showed excellent tolerance to sulfuric acid when compared with copper foil.

INDUSTRIAL APPLICABILITY

The present invention may be used in electronics or the like, for example.

DESCRIPTION OF NUMERICAL REFERENCES

1 graphite film
2 graphite fragment
3 lamination material

Obviously, numerous modifications and variations of the present invention are possible in light of the above teachings. It is therefore to be understood that within the scope of the appended claims, the invention may be practiced otherwise than as specifically described herein.

What is claimed is:

1. A film, comprising:
    a film body comprising graphite; and
    a plurality of fragments formed on at least one surface of the film body, wherein all fragments in the plurality of the fragments comprise graphite,
    wherein the film has a water contact angle of 50 degrees or greater and a glossiness of 20 or lower,
    wherein the plurality of the fragments are formed on the at least one surface at a density of 5/100 μm or higher,
    wherein each fragment of the plurality of the fragments has a maximum length of from 0.3 μm to 20 μm, and
    an end of each fragment of the plurality of the fragments is in contact with the at least one surface of the film body while another end of each of the fragments is detached from the at least one surface of the film body.

2. The film of claim 1, wherein the glossiness is 5 or lower.

3. The film of claim 1, wherein each fragment of the plurality of the fragments has a maximum length of from 10 μm to 20 μm.

4. A laminate, comprising:
    the film of claim 1; and
    at least one layer formed on at least one surface of the film and comprising at least one material selected from the group consisting of a metal, a resin, a metal oxide, a metal carbide, a metal nitride, a metal boride, and a metal silicide.

5. The laminate of claim 4, wherein the laminate has a sheet resistance in a planar direction of 25 mΩ/□ or lower.

6. The laminate of claim 4, wherein the at least one layer formed on at least one surface of the film comprises a resin, and the resin is a conductive resin.

7. The laminate of claim 4, wherein the at least one layer is formed only on one surface of the film.

8. The laminate of claim 4, wherein the at least one layer has an arithmetic mean roughness of 0.5 μm to 10 μm as measured in accordance with JIS B 0601:2001.

9. An electrode material, comprising:
    the laminate of claim 4, and
    a metal foil.

10. The film of claim 1, wherein each fragment of the plurality of the fragments has a maximum length of from 6 μm to 15 μm.

* * * * *